June 2, 1942.   M. A. EDWARDS   2,285,195
ELECTRICAL SYSTEM
Filed Jan. 1, 1942
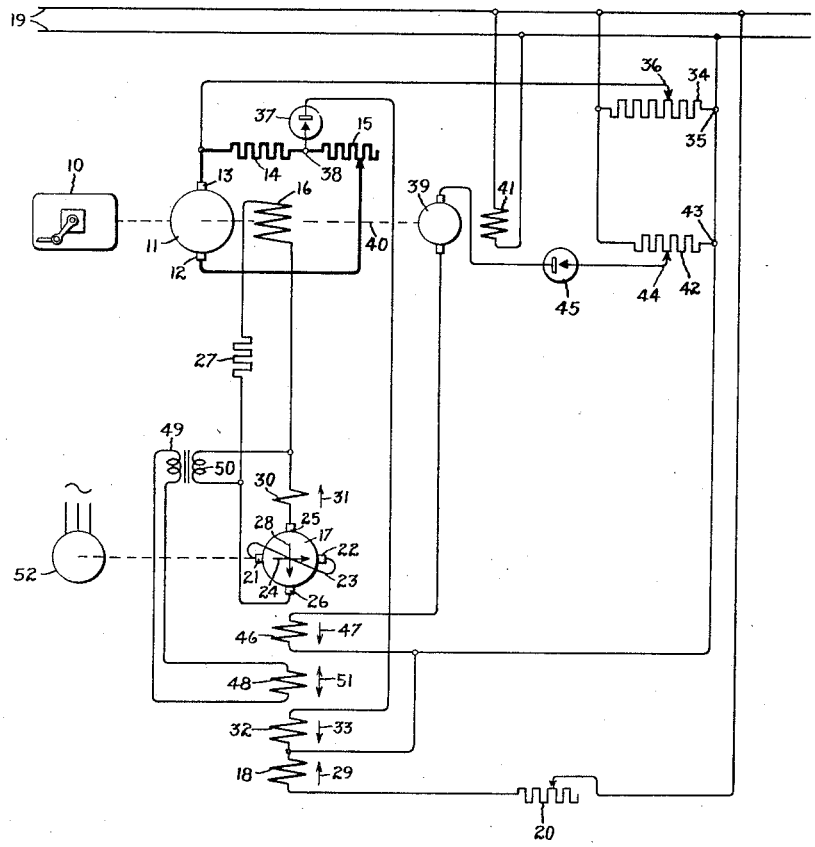
Inventor:
Martin A. Edwards,
by Harry E. Dunham
His Attorney.

Patented June 2, 1942

2,285,195

UNITED STATES PATENT OFFICE 2,285,195

ELECTRICAL SYSTEM

Martin A. Edwards, Scotia, N. Y., assignor to General Electric Company, a corporation of New York Application January 1, 1942, Serial No. 425,313

22 Claims. (Cl. 171—223)

My invention relates to electrical systems and in particular to dynamometer control systems used in testing various types of prime movers.

An object of my invention is to provide an improved electrical system for the control of dynamometers.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates an electrical system embodying my invention for the control of a dynamometer used in testing an internal combustion engine.

Referring to the drawing, I have shown an internal combustion engine 10 which is arranged to drive the rotatable member 11 of a dynamometer of any suitable type, such as a direct current dynamometer provided with a commutator connected to the winding of the rotatable member 11 and having brushes 12 and 13 connected to a load including resistances 14 and 15. The resistance section 14 of this load is substantially constant and the load on the machine is varied by changing the amount of resistance 15 included in the load circuit of the dynamometer. The dynamo-electric machine which forms the dynamometer is provided with a stationary field exciting winding 16 adapted to be energized by a main exciter which inherently limits the maximum load on the dynamometer. This main exciter is of the armature reaction excitation type and includes a rotatable member or an armature 17 of the conventional direct current type provided with a winding and a commutator connected thereto. The primary excitation of this machine is provided by a main field exciting winding 18 which is connected to a substantially constant voltage source of electrical power supply 19. The energization of this field exciting winding is adapted to be controlled by a suitable variable resistor 20 connected in series therewith. This field exciting winding provides a component of excitation along the secondary commutating axis of the main exciter 17 and when the armature of this exciter rotates, voltage is generated between primary brushes 21 and 22 arranged about the commutator of this exciter. An external short-circuiting conductor 23 electrically connects together the primary brushes 21 and 22 of the primary brush set so as to complete a primary circuit through the armature winding of the exciter. This permits a current to flow through the primary circuit of the armature winding which sets up an armature reaction indicated in the drawing by the arrow 24. As the armature rotates, the winding conductors cut the component of primary armature reaction and a voltage is generated between a set of secondary brushes 25 and 26. This secondary voltage causes an electric current to flow through the armature winding and energizes the field exciting winding 16 of the main generator. A current limiting resistor 27 is arranged in series with the field exciting winding 16 in order to limit the maximum energizing current of this field exciting winding. The flow of current through the secondary circuit of the exciter armature winding 17 produces a secondary component of armature reaction, represented by the arrow 28 in the drawing, which is opposed to the main field exciting winding component of energization represented by the arrow 29 in the drawing and provided by the field exciting winding 18. In order to minimize the current necessary to provide the controlling component of excitation 29, a compensating field exciting winding 30 is arranged on the exciter 17 to provide a component of excitation along the secondary commutating axis of the exciter, represented by the arrow 31, which is in opposition to the secondary armature reaction 28 and in the same direction as the main control component of excitation 29. The compensating field exciting winding 30 is energized by the secondary current of the main exciter, so that its energization is responsive to this secondary current and it is constructed and arranged so that the compensating component of excitation 31 is substantially equal and opposite to the secondary armature reaction 28, thereby effectively neutralizing this component of magnetic excitation and minimizing the amount of control excitation required of the field exciting winding 18. This increases the sensitivity of control of the entire system.

In this type system, it is desirable that the main load current of the main generator 11 should be limited to a maximum safe operating value. It is desirable that this should be inherent in the operation of the system, and in the illustrated arrangement this control feature is provided by a field exciting winding 32 arranged to provide a component of magnetic excitation along the secondary commutating axis of the main exciter 17 opposed to the control field exciting winding 18, as indicated by the arrow 33. The energization of this field exciting winding 32 is provided by a differential voltage by connecting the terminals of this field exciting winding across the substantially constant voltage source of electrical power supply 19, as provided by the voltage across a potentiometer resistance 34 included between terminals 35 and 36 in opposition to the drop across the main load resistance section 14. The potentiometer resistance 34 is connected directly across the separate source of electrical power supply 19 and the terminal 36 is adjustable, so that the drop across the resistance between the terminals 36 and 35 may be varied in order to vary the maximum load current on the main generator. A unidirectional current element 37, such as a copper oxide rectifier is connected in series with the field exciting winding 32 and a terminal 38 of the main load resistor 14. Thus, if the voltage drop across the resistance 14 is greater than the voltage drop across the resistance 34 between the terminals 35 and 36, current will flow through the unidirectional element 37 and the field exciting winding 32 so as to energize this field exciting winding to provide a component of excitation, as indicated by the arrow 33, thereby decreasing the resultant excitation along the secondary commutating axis of the main exciter. However, if the drop across the load resistance 14 is lower than the voltage drop across the resistance 34 between the terminals 35 and 36, no current will flow through the field exciting winding 32 and it will remain deenergized, for the unidirectional element 37 will prevent a reversal of energizing current through this circuit. In this manner, the field exciting winding 32 will only be energized to decrease the excitation of the main exciter when the load on the main generator 11 exceeds a predetermined value, and this energization will be responsive to the load current of the generator.

In order to assure the proper loading of the engine 10 by the generator 11, it is desired that these two units should operate at some predetermined speed. This predetermined speed should be a controllable factor and should be limited to a predetermined safe operating value. In order to obtain this result, an auxiliary or pilot exciter 39 is arranged to be driven through the engine generator shaft 40 at a speed having a predetermined speed relation to that of the engine 10 and the generator 11. This exciter 39 preferably is built as an unsaturated dynamo-electric machine and is excited by a field exciting winding 41 energized by the substantially constant voltage source of electrical power supply 19 so as to provide an electrical voltage which bears a substantially constant proportionate relation to the speed of the machine. This exciter 39 is connected in series with and in opposition to a part of a potentiometer resistance 42 between the terminals 43 and 44 of this potentiometer resistance in series with a unidirectional current element 45, such as a copper oxide rectifier, and this differential voltage is connected across a field exciting winding 46 arranged to provide a component of magnetic excitation 47 along the secondary commutating axis of the main exciter 17 in opposition to the excitation 29 of the main field exciting winding 18. The potentiometer resistance 42 is connected across the substantially constant source of electrical power supply 19, such that if the voltage drop across the part of the resistance 42 connected between the terminals 43 and 44 is greater than the voltage of the speed responsive auxiliary exciter 39, no current flows through this circuit, as the unidirectional current element 45 will prevent the flow of current. This unidirectional current element 45, however, is arranged such that whenever the voltage of the auxiliary exciter 39, responsive to the speed of the main generator 11, exceeds the voltage drop across the resistance 42 between the terminals 43 and 44, current will flow through this circuit and energize the field exciting winding 46. The auxiliary exciter 39 is constructed such that its voltage normally is greater than the drop across the resistance 42 between the terminals 43 and 44, such that the field exciting winding 46 is energized under normal operating conditions and is deenergized only when the main generator 11 is operating below a predetermined speed or when this main generator is coming up to its normal operating speed, during which conditions the field exciting winding 46 is deenergized because of the low speed of the auxiliary exciter 39. This requires that the main field exciting winding 18 provide an excitation equal to the main control component and, in addition, a component of excitation equal and opposite to the excitation 47 of the speed responsive field exciting winding 46.

In order to assure stable operation of the excitation of this system, a field exciting winding 48 is arranged to provide a component of excitation along the secondary commutating axis of the main exciter 17 and is energized by connection across the secondary 49 of a transformer, the primary winding 50 of which is connected across the secondary terminals of the main exciter 17 and across the field exciting winding 16 of the main generator 11. This connection of the field exciting winding 48 is such that any transient variations in the energization of the main generator field exciting winding 16 will induce a corresponding variation in the transformer secondary winding 49, and the field exciting winding 48 will produce a component of excitation 51 which will oppose the transient variations in the energization of the main generator field exciting winding 16 by inducing a voltage in the armature winding of the main exciter 17 which will oppose such transient variations. The desired response of the main exciter 17 to all of the various components of excitation is obtained by driving this main exciter 17 at a substantially constant speed by a constant speed source of mechanical power, such as a synchronous motor 52 which is mechanically coupled to the armature 17 of the main exciter.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, and means including a second field exciting winding for providing a component of excitation responsive to the load current of said main generator and along the secondary commutating axis of said main exciter in opposition to said main field exciting winding.

2. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, and means for providing a component of excitation responsive to the load current of said main generator along the secondary commutating axis of said main exciter in opposition to said main exciter first field exciting winding when the load current of said main exciter exceeds a predetermined value.

3. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, a third field exciting winding arranged to provide a component of excitation along the secondary commutating axis of said main exciter in opposition to said exciter main field exciting winding, and means for energizing said third field exciting winding when the load current of said main generator exceeds a predetermined value responsive to the load current of said main generator.

4. An electrical system including a main generator having a field exciting winding, a main exciter having an armature provided with a winding and a comutator connected thereto, a set of primary brushes and a slot of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, and means including a third field exciting winding for providing a component of excitation responsive to the load current of said main generator and along the secondary commutating axis of said main exciter in opposition to said exciter main field exciting winding when the load current of said generator exceeds a predetermined value.

5. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, means including a second field exciting winding for providing a component of excitation responsive to the load current of said main generator and means for providing a component of excitation along the secondary commutating axis of said main exciter for opposing transient variations in the secondary current of said main exciter responsive to the energization of said main generator field exciting winding.

6. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, a third field exciting winding arranged to provide a component of excitation along the secondary commutating axis of said main exciter in opposition to said exciter main field exciting winding, means for energizing said third field exciting winding when the load current of said main generator exceeds a predetermined value responsive to the load current of said main generator.

7. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, means including a second field exciting winding for providing a component of excitation responsive to the load current of said main generator and along the secondary commutating axis of said main exciter in opposition to said main field exciting winding, and means for providing a component of excitation along the secondary commutating axis of said main exciter for substantially neutralizing the armature reaction of said secondary circuit current in said main exciter armature.

8. An electric system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, means for providing a component of excitation responsive to the load current of said main generator along the secondary commutating axis of said main exciter in opposition to said main exciter first field exciting winding when the load current of said main generator exceeds a predetermined value, and means for providing a component of excitation along the secondary commutating axis of said main exciter for opposing transient variations in the secondary current of said main exciter responsive to the energization of said main generator field exciting winding.

9. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means for providing a component of excitation to said main exciter along the secondary commutating axis thereof in opposition to said main exciter first field exciting winding above a predetermined main generator speed responsive to the speed of said main generator, means for providing a component of excitation responsive to the load current of said main generator along the secondary commutating axis of said main exciter in opposition to said main exciter first field exciting winding when the load current of said main generator exceeds a predetermined value, and means for providing a component of excitation along the secondary commutating axis of said main exciter for substantially neutralizing the armature reaction of said secondary circuit current in said main exciter armature.

10. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for connecting said secondary brushes to said main generator field exciting winding, means including a main field exciting winding for said main exciter for providing a component of excitation thereto along the secondary commutating axis thereof, a second field winding for said main exciter arranged to provide a component of excitation thereto along the secondary commutating axis thereof in opposition to said first main exciter first field exciting winding, means including a source of electrical power supply responsive to the speed of said main generator and a substantially constant voltage source of electrical power supply arranged in opposition to each other for energizing said second field exciting winding, means for preventing the energization of said main exciter second field exciting winding above a predetermined main generator speed, a third field exciting winding arranged to provide a component of excitation along the secondary commutating axis of said main exciter in opposition to said main field exciting winding, and means for energizing said third field exciting winding responsive to the load current of said main generator when the load current of said main generator exceeds a predetermined value.

11. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said first main exciter field exciting winding, means including an auxiliary exciter responsive to the speed of said main generator and a substantially constant voltage source of electrical power supply arranged in opposition to each other for energizing said second field exciting winding, means for preventing the energization of said second main exciter field exciting winding above a predetermined main generator speed, and means including a third field exciting winding for providing a component of excitation along the secondary commutating axis of said main exciter in opposition to said exciter main field exciting winding when the load current of said main generator exceeds a predetermined value responsive to the current of said main generator.

12. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said main exciter first field exciting winding, means including an auxiliary exciter responsive to the speed of said main generator and a substantially constant voltage source of electrical power supply arranged in opposition to each other for energizing said second field exciting winding, means for preventing the energization of said second field exciting winding above a predetermined main generator speed, and means for providing a component of excitation responsive to the load current of said main generator and along the secondary commutating axis of said main exciter in opposition to said main field exciting winding when the load current of said main generator exceeds a predetermined value.

13. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, means including a third field exciting winding for providing a component of excitation responsive to the load current of said main generator and along the secondary commutating axis of said main exciter in opposition to said exciter main field exciting winding when the load current of said generator exceeds a predetermined value, and means including a fourth field exciting winding for providing a component of excitation along the secondary commutating axis of said main exciter for substantially neutralizing armature reaction of secondary circuit current in said main exciter armature.

14. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, means including a third field exciting winding for providing a component of excitation responsive to the load current of said main generator and along the secondary commutating axis of said main exciter in opposition to said exciter main field exciting winding when the load current of said generator exceeds a predetermined value, and means including a fourth field exciting winding for providing a component of excitation along the secondary commutating axis af said main exciter for opposing transient variations in the secondary current thereof responsive to the energization of said main generator field exciting winding.

15. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said main exciter first field exciting winding, means including an auxiliary exciter responsive to the speed of said main generator and a substantially constant voltage source of electrical power supply arranged in opposition to each other for energizing said second field exciting winding, means for preventing the energization of said second field exciting winding above a predetermined main generator speed, means for providing a component of excitation responsive to the load current of said main generator and along the secondary commutating axis of said main exciter in opposition to said main field exciting winding when the load current of said main generator exceeds a predetermined value, and means for providing a component of excitation along the secondary commutating axis af said main exciter for opposing transient variations in the secondary current of said main exciter responsive to the energization of said main generator field exciting winding.

16. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said main exciter first field exciting winding, means including an auxiliary exciter responsive to the speed of said main generator and a substantially constant voltage source of electrical power supply arranged in opposition to each other for energizing said second field exciting winding, means for preventing the energization of said second field exciting winding above a predetermined main generator speed, means for providing a component of excitation responsive to the load current of said main generator and along the secondary commutating axis of said main exciter in opposition to said main field exciting winding when the load current of said main generator exceeds a predetermined value, and means for providing a component of excitation along the secondary commutating axis of said main exciter for substantially neutralizing the armature reaction of said secondary circuit current in said main exciter armature.

17. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, means including a second field exciting winding for said main exciter for providing a component of excitation thereto along the secondary commutating axis thereof in opposition to said first main exciter field exciting winding above a predetermined main generator speed responsive to the speed of said main generator, a third field exciting winding arranged to provide a component of excitation along the secondary commutating axis of said main exciter in opposition to said exciter main field exciting winding, means for energizing said third field exciting winding when the load current of said main generator exceeds a predetermined value responsive to the load current of said main generator, and means including a fourth field exciting winding for providing a component of excitation along the secondary commutating axis of said main exciter for opposing transient variations in the secondary current thereof responsive to the energization of said main generator field exciting winding.

18. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said first main exciter field exciting winding, means including an auxiliary exciter responsive to the speed of said main generator and a substantially constant voltage source of electrical power supply arranged in opposition to each other for energizing said second field exciting winding, means for preventing the energization of said second main exciter field exciting winding above a predetermined main generator speed, means including a third field exciting winding for providing a component of excitation along the secondary commutating axis of said main exciter in opposition to said exciter main field exciting winding when the load current of said main generator exceeds a predetermined value responsive to the current of said main generator, and means including a fourth field exciting winding for providing a component of excitation along the secondary commutating axis of said main exciter for substantially neutralizing armature reaction of secondary circuit current in said main exciter armature.

19. An electrical system including a main generator having a field exciting winding, a main exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said first main exciter field exciting winding, means including an auxiliary exciter responsive to the speed of said main generator and a substantially constant voltage source of electrical power supply arranged in opposition to each other for energizing said second field exciting winding, means including an auxiliary exciter responsive to the speed of said main generator and a substantially constant voltage source of electrical power supply arranged in opposition to each other for energizing said second field exciting winding, means for preventing the energization of said second exciter field exciting winding above a predetermined speed of said main generator, means including a third field exciting winding for providing a component of excitation responsive to the load current of said main generator and along the secondary commutating axis of said main exciter in opposition to said exciter main field exciting winding when the load current of said main generator exceeds a predetermined value, and means for providing a component of excitation along the secondary commutating axis of said main exciter for opposing transient variations in the secondary current thereof responsive to the energizaton of said main generator field exciting winding.

20. An electrical system including a main generator having a field exciting winding, a main exciter having an armature provided with a winding and a commutator connected thereto, a set of primary brushes and a set of secondary brushes displaced about said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary commutating axis thereof, a second field exciting winding for said main exciter arranged to provide a component of excitation thereto along the secondary commutating axis thereof in opposition to said first main exciter field exciting winding, means including an auxiliary exciter responsive to the speed of said main generator and a substantially constant voltage source of electrical power supply arranged in opposition to each other for energizing said second field exciting winding, means including an auxiliary exciter responsive to the speed of said main generator and a substantially constant voltage source of electrical power supply arranged in opposition to each other for energizing said second field exciting winding, means for preventing the energization of said second exciter field exciting winding above a predetermined speed of said main generator, means including a third field exciting winding for providing a component of excitation responsive to the load current of said main generator and along the secondary commutating axis of said main exciter in opposition to said exciter main field exciting winding when the load current of said main generator exceeds a predetermined value, means for providing a component of excitation along the secondary commutating axis of said main exciter for opposing transient variations in the secondary current thereof responsive to the energization of said main generator field exciting winding, and means for providing a component of excitation along the secondary commutating axis of said main exciter for substantially neutralizing the armature reaction of said secondary circuit current in said main exciter armature.

21. An electrical system including a main generator having a field exciting winding, an exciter arranged to energize said main generator field exciting winding, means including a field exciting winding for providing the component of excitation to said exciter responsive to the speed of said main generator, means including a second field exciting winding for providing a component of excitation to said exciter responsive to the load current of said main generator and in the same direction as said first exciter field exciting winding arranged to be energized only when the load current of said main generator exceeds a predetermined value, and a third and main field exciting winding on said exciter for providing a component of excitation in opposition to said first and second exciter field exciting windings.

22. An electrical system including a main generator having a field exciting winding, an exciter arranged to energize said main generator field exciting winding, means including a field exciting winding for providing the component of excitation to said exciter responsive to the speed of said main generator, means including a second field exciting winding for providing a component of excitation to said exciter responsive to the load current of said main generator and in the same direction as said first exciter field exciting winding arranged to be energized only when the load current of said main generator exceeds a predetermined value, a third and main field exciting winding on said exciter for providing a component of excitation in opposition to said first and second exciter field exciting windings, and means including a fourth field exciting winding on said exciter for opposing transient variations in the energization of said main generator field exciting winding provided by said exciter.

MARTIN A. EDWARDS.